(No Model.)

A. C. BELL.
SPRING.

No. 571,637. Patented Nov. 17, 1896.

WITNESSES:
Jos. A. Ryan
P. B. Turpin

INVENTOR
Alexander C. Bell

BY Munn & Co.

ATTORNEYS.

UNITED STATES PATENT OFFICE.

ALEXANDER CULBERTSON BELL, OF NEW ALEXANDRIA, PENNSYLVANIA.

SPRING.

SPECIFICATION forming part of Letters Patent No. 571,637, dated November 17, 1896.

Application filed January 6, 1896. Serial No. 574,476. (No model.)

*To all whom it may concern:*

Be it known that I, ALEXANDER CULBERTSON BELL, of New Alexandria, in the county of Westmoreland and State of Pennsylvania, have invented a new and useful Improvement in Springs, of which the following is a specification.

My invention is an improvement in springs which may be embodied in buggies, carriages, road-wagons, cars, ambulances, bicycles, or other vehicles, or in office-chairs, stretchers, beds, car chairs and seats, hall and school seats, spring-seats on road-wagons, and in other locations where a spring may be desirable or necessary.

The invention is largely in the nature of what might be termed a "jolt-receiver," being designed to avoid any jolting by causing the same to be borne or counteracted by the springs proper.

Figure 1:
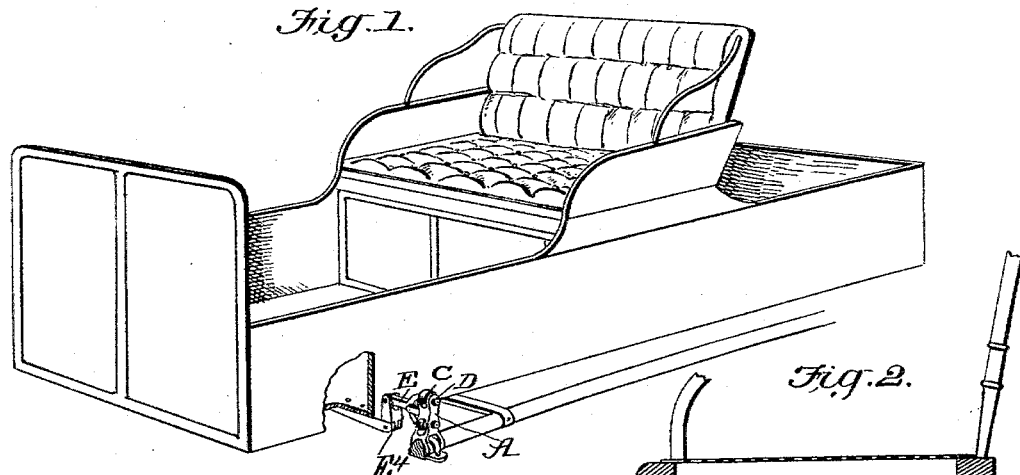
Figure 2:
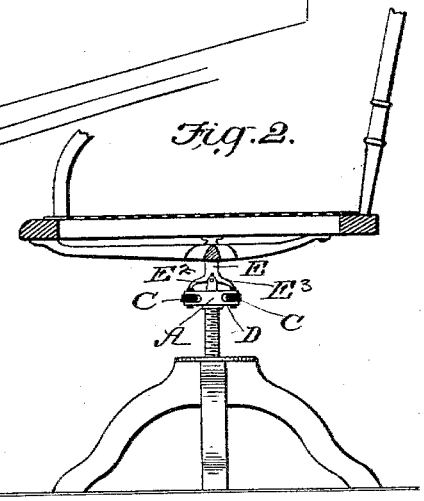
Figure 5:
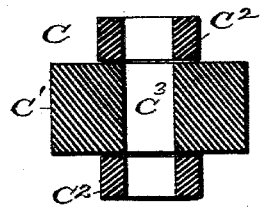
Figure 3:
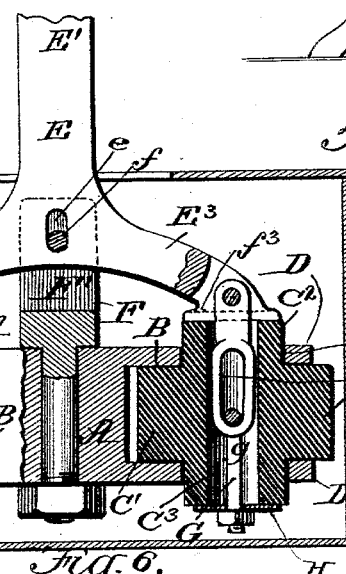
Figure 4:
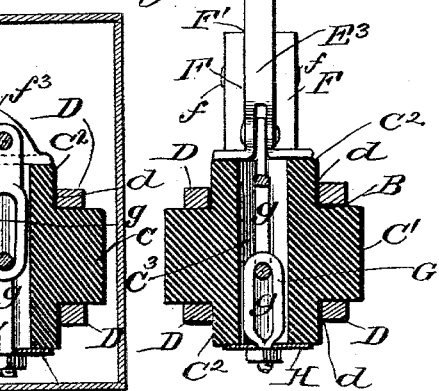
Figure 6:
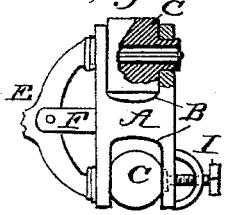

In the drawings, Figure 1 is a perspective view of buggy provided with my improvement, parts being broken away and others removed. Fig. 2 shows the spring applied to an office-chair. Figs. 3 and 4 are detailed sectional views of the spring or jolt-receiver. Fig. 5 shows a somewhat-different construction of rubber block, and Fig. 6 is a detail view.

In carrying out my invention I may employ a holder A for the springs proper and for the lever. This holder A is shown as a block or body having at its ends recesses or cavities B for the springs C, such recesses B being formed between lugs D, having openings $d$. Between the openings $d$ I connect the lever E, preferably, to a lug F, having a slot F' to receive the lever and a cross-pin $f$, which secures the said lever, as shown. This lever E has the main arm E' and the branch arms $E^2$ $E^3$ and is pivoted upon the pin $f$, the opening $e$ for such pin being elongated, so that the lever can move longitudinally upon the pin in order that a depression of the lever will not be received upon the pin and produce a jolt, but will be borne upon the springs proper, the latter receiving and taking up the jolt, as will be understood from the drawings.

The branch arms $E^2$ $E^3$ extend over the holder A to a point above the springs C, which springs C are preferably as shown as I will now describe. These springs are of rubber, having a body C' fitted in the recess B, and tenons $C^2$ $C^2$, which project through openings $d$ in the upper and lower walls B' of the recess B, and longitudinally through these springs I form an opening $C^3$ for the links G, which pass through the rubber springs and are held at the lower ends thereof by washers H and connect at the upper ends of the springs with the branch arms $E^2$ $E^3$ of the levers, such arms being flattened or spread at $f^2$ $f^3$ above the springs and at the point of connection of the links, this construction avoiding the necessity of washers above the springs and affording a broad durable bearing for pressure upon the spring. The link G is shown as made sectional, with the sections $g$ $g$ looped together within the rubber block and formed to slide upon each other within the block when the arm of the lever presses upon said block. Instead of the sectional link a single link may be employed operating within a tube fitted in the block, as shown in Fig. 6.

Instead of leaving the rubber springs exposed, as shown, they may be closed in by any suitable form of casing.

In practice it will be understood that the support A may be mounted upon a suitable frame, which may in the case of a vehicle be the hind axle, to which the support may be secured by means of a clip around the spring-bar or side coupling, as the case may be, the clipping on being effected in much the same manner as is now used in clipping iron on buggies, &c.

While it may be preferred to use the links in both the rubber springs, it may in some instances be desirable to omit one of the links, the lower one, as shown in Fig. 1, and arrange a set-screw I to turn through the frame to bear against the lower rubber, which screw may be adjusted to set the vehicle or other spring-supported object up or down, as desired.

In the use of the improved spring upon chairs the support may be attached to the elevating-screw thereof, such screw forming the frame, and the lever be attached to the chair-bottom in any desired manner. In such use of the improvement the chair may be rocked back or forth, and, when at rest, will be supported upon the rubber, the slot in the lever avoiding any solid bearing for the lever and furnishing a yielding support for the chair in all positions. This construction obviates a solid center and furnishes a yielding spring-bearing at all points, thus furnishing an efficient jolt-receiver.

The lever has at its upper end a jointed section $E^4$, whose connection with the body of the lever is such that it is rigid as to movement above a horizontal line.

Having thus described my invention, what I claim as new, and desire to secure by Letters Patent, is—

1. In a spring substantially as described the combination with the support and the springs proper held thereto and spaced apart of the lever jointed to the support between the springs proper and having rigid arms extending over the springs and a link connecting one of said arms with its respective spring substantially as set forth.

2. The combination of the support the springs held thereto and spaced apart the lever jointed to the support between the springs and having rigid arms extending thereover and links connected with said arms and extended through and held at the opposite ends of the springs substantially as set forth.

3. The spring herein described consisting of the support the springs proper held to said support the lever having a sliding connection with said support and provided with rigid arms extending over the springs, and links connected with the lever-arms and extended thence through the springs proper and held substantially as and for the purposes set forth.

4. A spring substantially as described comprising the support having opposite fixed portions held rigidly together and provided between them with a space for the springs and having in such fixed portion openings, and the springs fitted between said fixed portions and having tenon-like ends entering the same substantially as shown and described.

ALEXANDER CULBERTSON BELL.

Witnesses:
 JAMES K. MOORHEAD,
 I. N. DU SHAM.